UNITED STATES PATENT OFFICE.

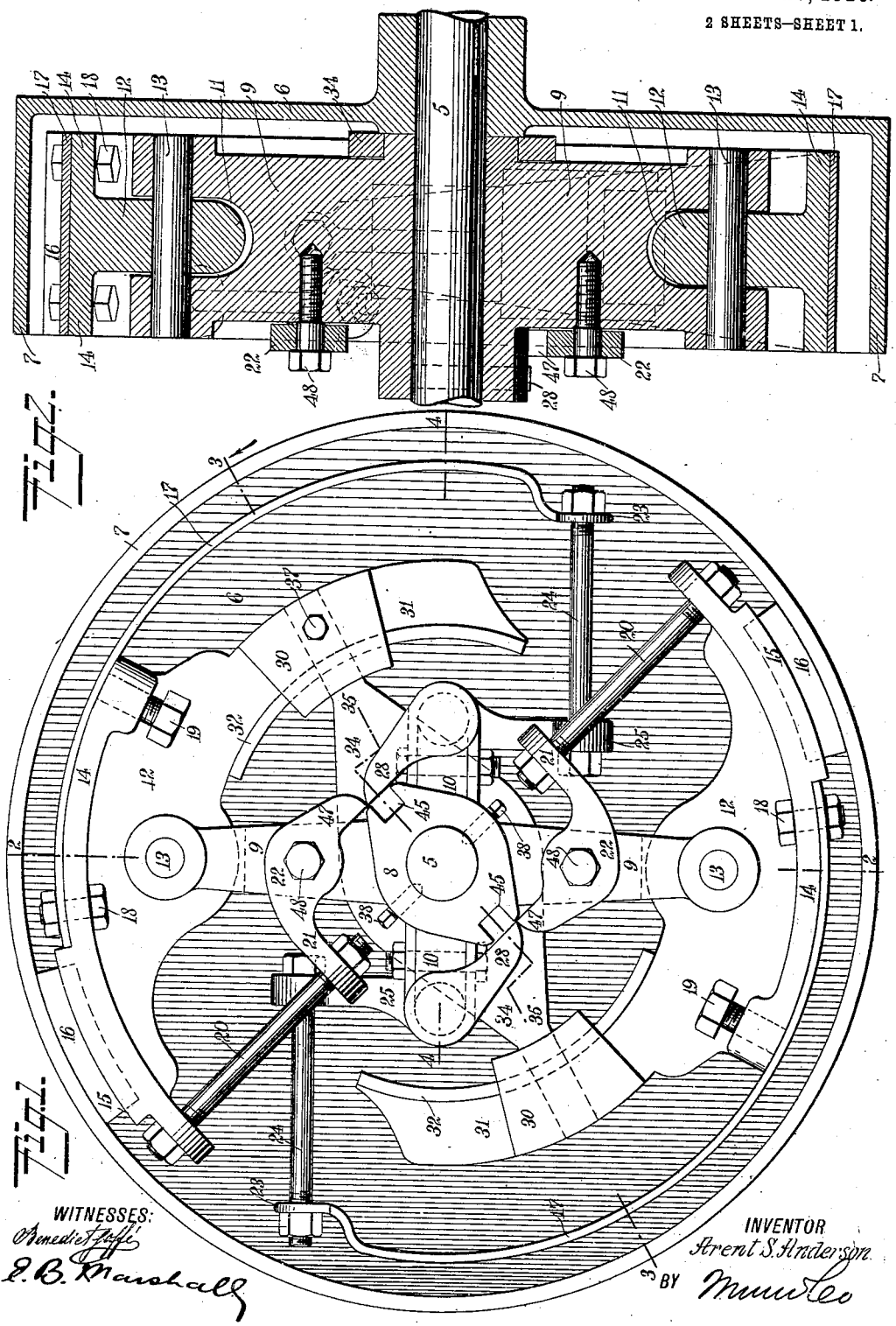

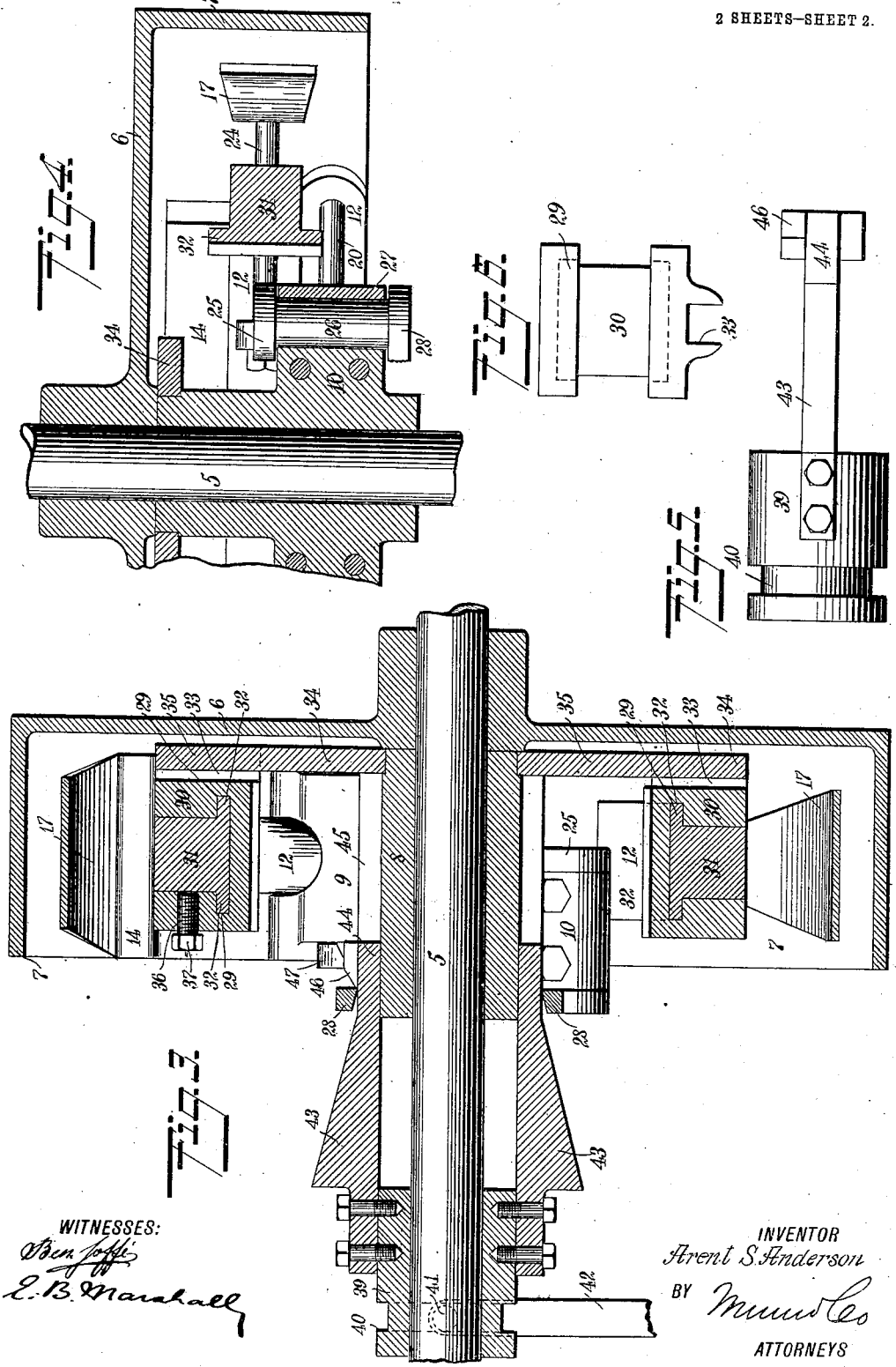

ARENT S. ANDERSON, OF ELLIOTT, ILLINOIS.

FRICTION CLUTCH-PULLEY.

977,257. Specification of Letters Patent. Patented Nov. 29, 1910.

Application filed May 18, 1910. Serial No. 561,987.

*To all whom it may concern:*

Be it known that I, ARENT S. ANDERSON, a citizen of the United States, and a resident of Elliott, in the county of Ford and State of Illinois, have invented a new and Improved Friction Clutch-Pulley, of which the following is a full, clear, and exact description.

My invention relates to improvements in friction clutch pulleys, and it has for its object to provide one having means which permits of its ready adjustment to different speeds.

Another object of my invention is to provide an equalizing means for the weights mounted on the arms of the levers, to make certain that a perfect balance of the pulley is obtained.

Still another object of the invention is to provide resilient means for holding the shoes against the flange of the pulley, and independent means for freeing the shoes from the pulley.

A further object of the invention is to provide a sleeve mounted to slide on the shaft, with means for regulating the tension of the springs forming the resilient means, and also with means for operating the means for freeing the shoes from the flange.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views, and in which—

Figure 1 is a side elevation of my friction clutch pulley; Fig. 2 is a sectional view on the line 2—2 of Fig. 1; Fig. 3 is a sectional view on the line 3—3 of Fig. 1; Fig. 4 is a fragmentary sectional view on the line 4—4 of Fig. 1; Fig. 5 is a view showing the sleeve and the cone-shaped members carried thereby, which operate the cams; and Fig. 6 is a view of one of the weights mounted on the arms.

By referring to the drawings, it will be seen that a shaft 5 is provided, on which is mounted a pulley member 6, the pulley member 6 being provided with an annular flange 7, there being another pulley member consisting of a hub 8, to which are secured two radially-disposed arms 9. The hub 8 also is provided with two projecting portions 10, these projecting portions being preferably radially-disposed and at right angles to the arms 9. The arms 9 have recesses 11, which extend through their outer terminals, the levers 12 being disposed in these recesses 11 and being pivoted to the arms 9 by the pivots 13. The levers 12 have the sides of one set of their arms provided with flanges 14, which extend beyond the pivots 13. One of the arms of each of the levers 12 is provided, on its outer face, with a box-shaped member 15, shoes 16 being disposed in these box-shaped members 15 respectively, these shoes being adapted to engage the inner surface of the flange 7 of the pulley which the box-shaped members 15 are secured to the levers 12 by means of bolts 18, the bolts 18 passing through the curved leaf springs 17 and through the flanges 14 of the levers 12, as best shown in Fig. 2 of the drawings. Screws 19, which mesh in threaded orifices in the flanges 14, engage the surfaces of the leaf springs 17 respectively, by which means it is possible to regulate the tension of the springs, this being done by turning the screws 19 in their threaded orifices, the screws engaging the leaf springs and pushing them outwardly, as will be readily understood. Disposed through orifices in the terminals of the arms of the levers 12, to which the box-shaped members 15 are secured, are bolts 20, these bolts 20 being also disposed through orifices in arms 21 of cam members 22, which are pivoted to the arms 9 respectively. The curved leaf springs 17 have orifices in their terminals 23, in which are disposed bolts 24, the bolts 24 being also disposed through orifices in arms 25, which are secured to pins 26 journaled in bearings 27 in the projecting portions 10 of the hub 8, cams 28 being also secured to these pins 26.

As has been stated, the box-shaped members carrying the shoes 16 are secured to one set of arms of the levers 12. The other arms 31 of these levers 12 are curved and have lateral flanges 32, counterweights 30 being mounted to travel on these arms 31 of the levers 12, which are provided with the lateral flanges 32. These counterweights 30 have guideways 29 in which the lateral flanges 32 of the arm 31 of the lever 12, travel. As best shown in Figs. 3 and 6 of the drawings, the counterweights 30 are provided with guideways 33, which are at all times radially disposed, inasmuch as, as has been stated, the counterweights 30 travel on the curved arms 31 of the levers 12.

An equalizing member 34 is journaled on the hub 8, this equalizing member 34 having arms 35, which are adapted to travel in the guideways 33 of the counterweights 30. One of the counterweights 30 has in its side a threaded orifice 36 in which is disposed a screw 37, the screw 37 being adapted to press against the arm 31 of the lever 12 to hold the counterweight in position relatively thereto. It will be understood that these screws 37 may be used to secure both of the counterweights in position, but, in most cases, this is not necessary inasmuch as the other counterweight will be held in position by the equalizer, which connects the two counterweights and does not permit of one of the counterweights moving relatively to the fulcrum of the lever on which it is mounted unless a corresponding movement of the other counterweight takes place.

As shown in Fig. 1 of the drawings, set screws 38 are provided, which are disposed in threaded orifices in the hub 8 and which press against the shaft 5 to hold the hub so that it will rotate therewith. A sleeve 39 is slidably mounted on the shaft 5, this sleeve 39 being preferably keyed to the shaft, so that it will rotate therewith. There is an annular groove 40 in the sleeve 39 in which travels a boss 41 on a lever arm 42, by which means it is possible to shift the sleeve along the shaft. Secured to the sleeve 39 there are cone-shaped members 43, the outer sides of which converge in the direction of the hub 8, the terminals 44 of these cone-shaped members 43 serving as guides which are adapted to travel in guideways 45 in the hub 8. The inner ends of these cone-shaped members 43 are also provided with lateral members 46, these lateral members 46 extending radially and beyond the inner ends of the cone-shaped members 43 and having their outer portions tapering downwardly.

As will be seen by referring to Fig. 3 of the drawings, the cams 28 are disposed outwardly beyond the cams 47 of the cam members 22. The cams 28 are adapted to be operated by engagement with the surfaces of the cone-shaped members 43, while the cams 47 are adapted to be operated by engagement with the lateral projecting members 46. As will be seen, by referring to the drawings, the cam members 22 are pivoted to the arms 9 by means of the pins 48.

When the members have been constructed and have been assembled as has been described, it will readily be seen that, when the pulley member 6 is rotated, it will carry with it the other pulley member, the hub of which is secured to the shaft 5, as has been described. This is so as the curved leaf springs 17 will normally hold the levers 12 with the shoes 16 pressed against the inner surface of the flange 7 of the pulley member 6. Should the speed of the pulley member 6 increase, centrifugal force will throw the arms 31, carrying the weights 30 outwardly, which movement of the levers 12 will cause the removal of the shoes 16 from the flange 7 until the speed of the pulley member having the hub 8 decreases. By means of the screws 19, it is possible to regulate as desired the tension of the leaf springs 17, so that the pulley member having the hub 8 will be freed from the pulley member 6, when the pulley member 6 reaches a predetermined speed. It is also possible, with the sleeve 39, to control the movement of the pulley member having the hub 8 relatively to the pulley member 6. This is so, for when the sleeve 39 is moved toward the pulley members, the cams 28 will travel up the inclined surfaces of the cone-shaped members 43, which will move the cams 28 outwardly, thereby rotating the pins 26 and causing the arms 25 to move inwardly, and since the arms 25 are connected with the leaf springs 17 by means of the bolts 24, the leaf springs will be drawn inwardly, thereby moving outwardly the arms of the levers 12 carrying the shoes 16. On the other hand, if the sleeve 39 is moved outwardly relatively to the hub 8, the cams 28 will move toward the shaft and the cams 47 will be moved away therefrom. As these cams 47 are moved outwardly, they will draw inwardly the arms 21 of the cam members 22 and, as these arms 21 are connected by means of the bolts 20 with the arms of the levers 12 carrying the shoes, as the arms 21 are drawn inwardly the shoes 16 will be moved out of engagement with the flange 7 of the pulley member 6.

Having thus described my invention, I claim as new and desire to secure by Letters Patent:

1. In a friction clutch pulley, a shaft, two members mounted on the shaft, one of the members having an arm, a lever, having a threaded orifice, pivoted to the arm, a shoe mounted on the arm of the lever, for engaging the other member, a leaf spring secured to the lever, a screw in the threaded orifice in the lever, the screw being adapted to engage the spring to regulate its tension, and means connecting the spring with the member having the arm.

2. In a friction clutch pulley, a shaft, two members mounted on the shaft, one of the members having an arm, a lever fulcrumed to the arm, a shoe mounted on the lever, for engaging the other member, a cam having an arm pivoted to the arm of the said member, means connecting the lever with the arm of the cam, and a member slidably mounted on the shaft for engaging the cam.

3. In a friction clutch pulley, a shaft, two members mounted on the shaft, one of the members having an arm, a lever fulcrumed to the arm, a shoe mounted on the lever, for engaging the other member, a cam having an arm pivoted to the arm of the member, a spring secured to the lever, and means connecting the spring with the member carrying the arm.

4. In a friction clutch pulley, a shaft, two members mounted on the shaft, one of the members having two arms, a member pivoted to each of the arms, shoes mounted on the pivoted members respectively, for engaging the other member, weights having guideways slidably mounted on the pivoted members respectively, and an equalizer having two arms, one disposed in each of the guideways, by which the weights may be moved simultaneously relatively to the pivoted members.

5. In a friction clutch pulley, a shaft, two members mounted on the shaft, one of the members having two arms, two levers, one fulcrumed to each of the arms, shoes mounted on the levers respectively, for engaging the other members, weights having guideways slidably mounted on the levers respectively, and an equalizer having two arms for traveling in the guideways respectively, the equalizer being mounted to rotate concentrically with the shaft.

6. In a friction clutch pulley, a shaft, two members mounted on the shaft, an arm on one of the members, a lever fulcrumed to the arm, a shoe mounted on the lever, for engaging the other member, a spring secured to the lever, a cam having an arm pivoted to the member having the arm, means connecting the spring with the arm of the cam, and means slidable on the shaft for operating the cam.

7. In a friction clutch pulley, a shaft, two members mounted on the shaft, an arm on one of the members, a lever fulcrumed to the arm, a shoe mounted on the lever, for engaging the other member, a spring secured to the lever, a cam having an arm pivoted to the member having the arm, means connecting the spring with the arm of the cam, a second cam having an arm pivoted to the arm on the member, means connecting the lever with the arm of the second cam, and means slidably mounted on the shaft for operating the cams.

8. In a friction clutch pulley, a shaft, two members mounted on the shaft, one of the members having a guideway and an arm, a lever fulcrumed to the arm, a shoe mounted on the lever, for engaging the other member, a cam having an arm pivoted to the arm of the member, means connecting the lever to the arm of the cam, a sleeve slidably mounted on the shaft having a guide adapted to travel in the guideway, and a member also carried by the sleeve for operating the cam.

9. In a friction clutch pulley, a shaft, two members mounted on the shaft, one of the members having a guideway and an arm, a lever fulcrumed to the arm, a shoe mounted on the lever, for engaging the other member, a spring secured to the lever, a cam having an arm pivoted to the member having the arm, means connecting the spring with the arm of the cam, a cam having an arm pivoted to the arm on the said member, means connecting the lever with the arm of the second cam, a sleeve slidably mounted on the shaft having a guide adapted to travel in the guideway, and a member also carried by the sleeve for operating the cams.

10. In a friction clutch pulley, a shaft, two members mounted on the shaft, one of the members having a guideway and an arm, a lever fulcrumed to the arm, a shoe mounted on the lever, for engaging the other member, a spring secured to the lever, a cam having an arm pivoted to the member having the arm, means connecting the spring with the arm of the cam, a cam having an arm pivoted to the arm on the said member, means connecting the lever with the arm of the second cam, the cams having their planes substantially parallel with and spaced from each other, and a sleeve slidably mounted on the shaft, guide members which are disposed in the guideways, the guide members being cone-shaped with the apex in the direction of their inner ends, and projecting cam members secured to the inner ends of the guideways, the cone-shaped guide members and the said cam members being adapted to operate the cams.

11. In a friction clutch pulley, a shaft, two members mounted on the shaft, two arms secured to one of the members, levers fulcrumed to the arms respectively, shoes mounted on the levers, for engaging the other member, weights having guideways slidably mounted on the levers respectively, an equalizer having arms disposed in the guideways, by which the weights are moved simultaneously relatively to the levers, springs secured to the levers, cams having arms pivoted to the member carrying the said arm, means connecting the springs with the arms of the cams respectively, and means slidably mounted on the shaft for operating the cams.

In testimony whereof I have signed my name to this specification in the presence of two subscribing witnesses.

ARENT S. ANDERSON.

Witnesses:
JOSEPH S. THORSEN,
W. A. KREITZER.